(12) United States Patent
Zhang et al.

(10) Patent No.: US 10,666,484 B2
(45) Date of Patent: May 26, 2020

(54) METHOD AND APPARATUS FOR TRANSMISSION OF SYNCHRONIZATION SIGNAL

(71) Applicant: ZTE Corporation, Guangdong (CN)

(72) Inventors: Wen Zhang, Guangdong (CN); Shuqiang Xia, Guangdong (CN); Bo Dai, Guangdong (CN); Kun Liu, Guangdong (CN); Jing Shi, Guangdong (CN); Xianming Chen, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 0 days.

(21) Appl. No.: 15/756,028

(22) PCT Filed: Sep. 21, 2016

(86) PCT No.: PCT/CN2016/099636
§ 371 (c)(1),
(2) Date: Feb. 27, 2018

(87) PCT Pub. No.: WO2017/054667
PCT Pub. Date: Apr. 6, 2017

(65) Prior Publication Data
US 2018/0248735 A1    Aug. 30, 2018

(30) Foreign Application Priority Data
Sep. 30, 2015    (CN) .......................... 2015 1 0638928

(51) Int. Cl.
*H04L 27/26*    (2006.01)
*H04L 5/00*    (2006.01)
(Continued)

(52) U.S. Cl.
CPC .......... *H04L 27/2655* (2013.01); *H04L 5/005* (2013.01); *H04L 27/261* (2013.01);
(Continued)

(58) Field of Classification Search
CPC ... H04L 27/2655; H04L 5/00; H04W 56/0005
See application file for complete search history.

(56) References Cited

U.S. PATENT DOCUMENTS

2010/0110873 A1    5/2010    Han et al.
2010/0296429 A1*   11/2010    Han ...................... H04L 12/189
                                                                370/312
(Continued)

FOREIGN PATENT DOCUMENTS

CN    101527595 A    9/2009
CN    101682498 A    3/2010
(Continued)

OTHER PUBLICATIONS

International Search Report dated Dec. 14, 2016, in corresponding International Application No. PCT/CN2016/099636.
(Continued)

*Primary Examiner* — Jay P Patel
(74) *Attorney, Agent, or Firm* — Duane Morris LLP

(57) ABSTRACT

The present disclosure provides a method and an apparatus for transmission of a synchronization signal. The method includes: transmitting, by a base station, the synchronization signal repeatedly and periodically to a terminal. In one repetition period, the synchronization signal is transmitted over time corresponding to a plurality of Orthogonal Frequency Division Multiplexing (OFDM) symbols in one or more subframes. The synchronization signal is a Primary Synchronization Signal (PSS) or a Secondary Synchronization Signal (SSS). Alternatively, the method includes: receiving, by a terminal, the synchronization signal trans-
(Continued)

mitted from a base station repeatedly and periodically. In this way, the problem associated with inappropriate design of the synchronization signals in the NB-LTE system can be solved and proper transmission of the synchronization signals in the narrow band system can be achieved.

10 Claims, 7 Drawing Sheets

(51) Int. Cl.
*H04W 56/00* (2009.01)
*H04J 11/00* (2006.01)

(52) U.S. Cl.
CPC ...... *H04W 56/0005* (2013.01); *H04J 11/0073* (2013.01); *H04J 11/0076* (2013.01)

(56) References Cited

U.S. PATENT DOCUMENTS

| | | | | |
|---|---|---|---|---|
| 2011/0007704 | A1* | 1/2011 | Swarts | H04J 11/0073 370/330 |
| 2013/0176952 | A1* | 7/2013 | Shin | H04L 5/001 370/329 |
| 2013/0229953 | A1* | 9/2013 | Nam | H04W 72/0426 370/280 |
| 2014/0219255 | A1* | 8/2014 | Eyuboglu | H04W 72/12 370/336 |
| 2014/0219267 | A1* | 8/2014 | Eyuboglu | H04W 56/001 370/350 |
| 2015/0016239 | A1 | 1/2015 | Yi et al. | |
| 2016/0014718 | A1* | 1/2016 | Mysore Balasubramanya | H04W 68/02 455/458 |
| 2016/0037550 | A1* | 2/2016 | Barabell | H04B 17/318 455/450 |
| 2017/0093540 | A1* | 3/2017 | Lei | H04L 5/0048 |
| 2018/0184390 | A1* | 6/2018 | Wu | H04W 4/70 |
| 2018/0309495 | A1* | 10/2018 | Xiong | H04J 11/00 |
| 2019/0372645 | A1* | 12/2019 | Xiong | H04L 5/00 |

FOREIGN PATENT DOCUMENTS

| | | |
|---|---|---|
| CN | 103391265 A | 11/2013 |
| JP | 2018-527801 A | 9/2018 |
| WO | 2017018966 A1 | 2/2017 |

OTHER PUBLICATIONS

Official Action issued in corresponding Chinese Patent Application No. 201610094692X.
Samsung Electronics, "pCR 45.820 Narrowband LTE (revision of GP-150690)", 3GPP TSG GERAN#67, GP-150846, Yinchuan, China, Aug. 10-14, 2015, 17 pages.
Official Action dated May 22, 2019, in corresponding Japanese Patent Application No. 2018-516165.
Ericsson, et al., "NB LTE—Concept Description L1", 3GPP TSG-RAN #69, RP-151397, Sep. 14-16, 2015, Phoenix, Arizona, pp. 1-24.
Extended European Search Report dated May 14, 2019, in corresponding European Patent Application No. 16850291.2.
ZTE: "Synchronization enhancement for V2V", 3GPP TSG-RAN WG1 Meeting #82bis, Malmo, Sweden, Oct. 5-9, 2015, R1-155234, 7 pages.
Huawei, et al., "D2DSS design", 3GPP TSG RAN WG1 Meeting #77, Seoul,Korea, May 19-23, 2014,R1-142340, 11 pages.
Huawei, et al., "Final details of D2D synchronization signals", 3GPP TSG RAN WG1 Meeting #79, San Francisco, USA, Nov. 17-21, 2014, R1-144566, 13 pages.
Cannon, M.J., "On the Design of D2D Synchronization in 3GPP Release-12", 2015 IEEE International Conference on Communication Workshop (ICCW), Jun. 8, 2015, pp. 633-638.

* cited by examiner

METHOD AND APPARATUS FOR TRANSMISSION OF SYNCHRONIZATION SIGNAL

TECHNICAL FIELD

The present disclosure relates to communication technology, and more particularly, to a method and an apparatus for transmission of a synchronization signal.

BACKGROUND

Machine Type Communication (MTC) User Equipment (UE) (or user terminal or terminal), also referred to as Machine to Machine (M2M) user communication device, is currently a main form of application of Internet of Things (IoT). In the 3rd Generation Partnership Project (3GPP) Technical Report (TR) 45.820 V200, several techniques suitable for Cellular IoT (C-IoT) are disclosed, among which a Narrow-Band Long Term Evolution (NB-LTE) is a most attractive one. The bandwidth of the system is 200 KHz, which is the same as the channel bandwidth of Global System for Mobile communication (GSM) system. This is advantageous for the NB-LTE system to reuse the spectra of the GSM system and reduce interference with neighboring GSM channels. The NB-LTE has a transmission bandwidth of 180 KHz and a downlink sub-carrier spacing of 15 KHz, which are the same as the bandwidth of one Physical Resource Block (PRB) and sub-carrier spacing of the Long Term Evolution (LTE) system. For such narrow band system, the design of Primary Synchronization Signal (PSS) and Secondary Synchronization Signal (SSS), occupying six PRBs in the current LTE system, is no longer suitable and a new design of PSS/SSS is thus needed.

In the related art, there is currently no feasible solution to the problem associated with inappropriate design of the synchronization signals in the NB-LTE system.

SUMMARY

The embodiments of the present disclosure provide a method and an apparatus for transmission of a synchronization signal, capable of solving at least the problem associated with inappropriate design of the synchronization signals in the NB-LTE system in the related art.

According to an aspect of the embodiments of the present disclosure, a method for transmission of a synchronization signal is provided. The method includes: transmitting, by a base station, the synchronization signal repeatedly and periodically to a terminal. In one repetition period, the synchronization signal is transmitted over time corresponding to a plurality of Orthogonal Frequency Division Multiplexing (OFDM) symbols in one or more subframes. The synchronization signal is a Primary Synchronization Signal (PSS) or a Secondary Synchronization Signal (SSS).

Optionally, for one of the one or more subframes, the plurality of OFDM symbols include a plurality of consecutive OFDM symbols in that subframe. Alternatively, when the synchronization signal is transmitted over the one or more subframes, the plurality of OFDM symbols are symbols from a predefined set including the third OFDM symbol, the fourth OFDM symbol and the last two OFDM symbol in each slot.

Optionally, the PSS is in k1 consecutive radio frames and transmitted at a period of T1 radio frames, where T1 and the SSS is transmitted at a period of T2 radio frames. Alternatively, the PSS is transmitted at a period of T3 radio frames and the SSS is in k2 consecutive radio frames and transmitted at a period of T4 radio frames, where T4≥k2. Alternatively, the PSS and the SSS are in k3 consecutive radio frames and transmitted at a period of T5 radio frames, where T5≥k3. Each of k1, k2, k3, T1, T2, T3, T4 and T5 is a positive integer.

Optionally, in one repetition period, the synchronization signal includes M OFDM symbols, in which the m-th OFDM symbol has a sub-carrier spacing of $15/A_m$ KHz, where $1 \leq m \leq M$ and each of m, M and $A_m$ is a positive integer.

Optionally, when $A_m=2$, the sub-carrier spacing is 7.5 KHz, and the OFDM symbols are two consecutive OFDM symbols including one of: the third OFDM symbol and the fourth OFDM symbol in a slot, or the last two OFDM symbol in a slot. When $A_m=4$, the sub-carrier spacing is 3.75 KHz, and the OFDM symbols are four consecutive OFDM symbols.

Optionally, in a standalone scenario, no reference signal is transmitted over the OFDM symbols corresponding to the synchronization signal in the one or more subframes in which the synchronization signal is located. Alternatively, in the standalone scenario, a reference signal is transmitted only over the first q OFDM symbols in the one or more subframes in which the synchronization signal is located, where q is a positive integer.

Optionally, in one repetition period, the synchronization signal includes a plurality of sequences generated based on a cell identity and/or timing information.

Optionally, in one repetition period the synchronization signal including a plurality of sequences includes: in one repetition period, each OFDM symbol included in the synchronization signal corresponding to one sequence, or in one repetition period, a plurality of OFDM symbols included in the synchronization signal corresponding to one sequence, and each of the OFDM symbols corresponding to a sub-sequence of the sequence, or in a plurality of subframes in one repetition period, each of the plurality of subframes corresponding to one sequence.

Optionally, in one repetition period, each OFDM symbol included in the synchronization signal corresponds to one sequence.

Optionally, each OFDM symbol included in the synchronization signal corresponds to a ZC sequence having of length of 11. The synchronization signal corresponds to a carrier including 12 sub-carriers.

Optionally, when each OFDM symbol, or a plurality of OFDM symbols, included in the synchronization signal corresponds to a sequence, the sequence is determined based on the OFDM symbol(s) corresponding to the sequence.

Optionally, the synchronization signal being transmitted over time corresponding to a plurality of OFDM symbols in one or more subframes in time domain includes: the synchronization signal being transmitted over time corresponding to m OFDM symbols, where $m \in \{5, 6, 7, 8, 10, 12\}$.

Optionally, the time corresponding to the plurality of OFDM symbols includes two portions each corresponding to one sequence. The two portions are divided in order of time. Alternatively, the two portions include time corresponding to OFDM symbols having odd indices and time corresponding to OFDM symbols having even indices. The indices are determined by re-numbering the OFDM symbols corresponding to the synchronization signal from 0 in order of time.

Optionally, on an OFDM symbol corresponding to the synchronization signal, for a sub-carrier that is not used for transmitting a Cell-specific Reference Signal (CRS), the synchronization signal is $y(k) x(k) c$, where $c = s(k_0)/x(k_0)$, $k_0$ is a sub-carrier index for CRS in a predetermined Resource Element (RE) on the symbol, $x(k_0)$ is a value of a PSS or SSS sequence corresponding to the sub-carrier # $k_0$, and $s(k_0)$ is a CRS symbol value corresponding to the sub-carrier # $k_0$.

According to another aspect of the present disclosure, a method for transmission of a synchronization signal is provided. The method includes: receiving, by a terminal, the synchronization signal transmitted from a base station repeatedly and periodically. In one repetition period, the synchronization signal is received over time corresponding to a plurality of Orthogonal Frequency Division Multiplexing (OFDM) symbols in one or more subframes. The synchronization signal is a Primary Synchronization Signal (PSS) or a Secondary Synchronization Signal (SSS).

Optionally, for one of the one or more subframes, the plurality of OFDM symbols include a plurality of consecutive OFDM symbols in that subframe. Alternatively, when the synchronization signal is received over the one or more subframes, the plurality of OFDM symbols are symbols from a predetermined set including the third OFDM symbol, the fourth OFDM symbol and the last two OFDM symbol in each slot.

Optionally, the PSS is in k1 consecutive radio frames and received at a period of T1 radio frames, where T1≥k1 and the SSS is received at a period of T2 radio frames. Alternatively, the PSS is received at a period of T3 radio frames and the SSS is in k2 consecutive radio frames and received at a period of T4 radio frames, where T4≥k2. Alternatively, the PSS and the SSS are in k3 consecutive radio frames and received at a period of T5 radio frames, where T5≥k3. Each of k1, k2, k3, T1, T2, T3, T4 and T5 is a positive integer.

Optionally, in one repetition period, the synchronization signal includes M OFDM symbols, in which the m-th OFDM symbol has a sub-carrier spacing of $15/A_m$ KHz, where 1≤m≤M and each of m, M and $A_m$ is a positive integer.

Optionally, when $A_m=2$, the sub-carrier spacing is 7.5 KHz, and the OFDM symbols are two consecutive OFDM symbols including one of: the third OFDM symbol and the fourth OFDM symbol in a slot, or the last two OFDM symbol in a slot. When $A_m=4$, the sub-carrier spacing is 3.75 KHz, and the OFDM symbols are four consecutive OFDM symbols.

Optionally, in a standalone scenario, no reference signal is received over the OFDM symbols corresponding to the synchronization signal in the one or more subframes in which the synchronization signal is located. Alternatively, in the standalone scenario, a reference signal is received only over the first q OFDM symbols in the one or more subframes in which the synchronization signal is located, where q is a positive integer.

Optionally, in one repetition period, the synchronization signal includes a plurality of sequences generated based on a cell identity and/or timing information.

Optionally, in one repetition period the synchronization signal including a plurality of sequences includes: in one repetition period, each OFDM symbol included in the synchronization signal corresponding to one sequence, or in one repetition period, a plurality of OFDM symbols included in the synchronization signal corresponding to one sequence, and each of the OFDM symbols corresponding to a sub-sequence of the sequence, or in a plurality of subframes in one repetition period, each of the plurality of subframes corresponding to one sequence.

Optionally, when each OFDM symbol, or a plurality of OFDM symbols, included in the synchronization signal corresponds to a sequence, the sequence is determined based on the OFDM symbol(s) corresponding to the sequence.

Optionally, the synchronization signal being received over time corresponding to a plurality of OFDM symbols in one or more subframes in time domain includes: the synchronization signal being received over time corresponding to m OFDM symbols, where m∈{5, 6, 7, 8, 10, 12}.

Optionally, the time corresponding to the plurality of OFDM symbols includes two portions each corresponding to one sequence. The two portions are divided in order of time. Alternatively, the two portions include time corresponding to OFDM symbols having odd indices and time corresponding to OFDM symbols having even indices. The indices are determined by re-numbering the OFDM symbols corresponding to the synchronization signal, starting from 0, in order of time.

Optionally, on an OFDM symbol corresponding to the synchronization signal, for a sub-carrier that is not used for receiving a Cell-specific Reference Signal (CRS), the synchronization signal is y(k) x(k) c, where c $s(k_0)/x(k_0)$, $k_0$ is a sub-carrier index for CRS in a predetermined Resource Element (RE) on the symbol, $x(k_0)$ is a value of a PSS or SSS sequence corresponding to the sub-carrier # $k_0$, and $s(k^0)$ is a CRS symbol value corresponding to the sub-carrier # $k_0$.

Optionally, the position of the synchronization signal is determined from at least one of: a cell identity; a frequency domain position, a PRB index or a frequency offset corresponding to the synchronization signal.

Optionally, the synchronization signal is located in the last N sub-carriers of the PRB in which the synchronization signal is located when the cell identity is X, or in the first N sub-carriers of the PRB in which the synchronization signal is located when the cell identity is Y, where N is a positive integer.

Optionally, the cell identity X satisfies mod(X, 3)=0, the cell identity Y satisfies mod(Y, 3)≠0. Alternatively, the cell identity Y satisfies mod(Y, 3)=2, the cell identity X satisfies mod(X, 3)≠2. Alternatively, the cell identity X satisfies mod(X, 6)=0, the cell identity Y satisfies mod(Y, 6)/0. Alternatively, the cell identity Y satisfies mod(Y, 6)=5, the cell identity X satisfies mod(X, 6)≠5.

Optionally, when each OFDM symbol included in the synchronization signal corresponds to one sequence, the sequence is a ZC sequence $$x_u(n) = e^{-j\frac{\pi u n(n+1)}{N}}, 0 \leq n \leq N-1$$

having of length of 11. Different root indices are used on neighboring OFDM symbols, where n denotes an index of a sequence value, u denotes a root index of the ZC sequence, and N denotes a length of the ZC sequence, where N=11.

Optionally, the root indices for the ZC sequences divided into groups in accordance with at least one of: a first scheme in which a first group includes ZC sequences having u={5, 6,4,7,3,8}, a second group includes ZC sequences having u={2,9}, and a third group includes ZC sequences having u={1,10}, and a second scheme in which a first group includes ZC sequences having u={1,10,2,9,3,8}, a second group includes ZC sequences having u={4,7}, and a third group includes ZC sequences having u={5,6}. The sequences in the second group and the sequences in the third group are inter-exchangeable.

Optionally, the first group of ZC sequences are mapped onto a first OFDM symbol, the second group of ZC sequences are mapped onto a second OFDM symbol, and the third group of ZC sequences are mapped onto a third OFDM symbol. The first OFDM symbol includes symbols having OFDM symbol index of {5,6,9,10,12,13} in a subframe, the second OFDM symbol includes symbols having OFDM symbol index of {3,4} in a subframe, and the third OFDM symbol includes symbols having OFDM symbol index of {7,8} in a subframe. The symbol index in a subframe starts from 0.

Optionally, the synchronization signal uses the same ZC sequence on the last but two OFDM symbol in a subframe as the ZC sequence used on the last OFDM symbol in the subframe, the ZC sequence used on the first OFDM symbol of the second slot, the ZC sequence used on the last OFDM symbol of the first slot, or the ZC sequence used by the synchronization signal on the first OFDM symbol in the subframe.

Optionally, for a normal Cyclic Prefix (CP), the root indices of the sequences corresponding to the OFDM symbols included in the synchronization signal are, in order of time, one of:
{1,2,3,4,5,6,7,8,9,10,1};
{1,2,3,4,5,1,6,7,8,9,10};
{1,10,2,9,3,5,8,4,7,5,6};
{1,10,2,9,3,8,4,7,6,5,6};
{2,9,5,6,1,10,4,7,3,8,3};
{2,9,3,8,1,10,4,7,5,6,5}.

Optionally, for an extended Cyclic Prefix (CP), the root indices of the sequences corresponding to the OFDM symbols included in the synchronization signal are, in order of time, one of:
{1,2,3,4,5,6,7,8,9};
{1,2,3,4,5,7,8,9,10};
{1,10,2,9, 3,4,7,5,6};
{1,10,2,9,3,8,4,7,6};
{1,5,6,2,9,3,8,4,7};
{1,4,7,2,9,3,8,5,6}.

According to another aspect of the embodiments of the present disclosure, an apparatus located in a base station side for transmission of a synchronization signal is provided. The apparatus includes: a transmitting module configured to transmit the synchronization signal repeatedly and periodically to a terminal. In one repetition period, the synchronization signal is transmitted over time corresponding to a plurality of Orthogonal Frequency Division Multiplexing (OFDM) symbols in one or more subframes. The synchronization signal is a Primary Synchronization Signal (PSS) or a Secondary Synchronization Signal (SSS).

According to another aspect of the embodiments of the present disclosure, an apparatus located in a terminal side for transmission of a synchronization signal is provided. The apparatus includes: a receiving module configured to receive the synchronization signal transmitted from a base station repeatedly and periodically. In one repetition period, the synchronization signal is received over time corresponding to a plurality of Orthogonal Frequency Division Multiplexing (OFDM) symbols in one or more subframes. The synchronization signal is a Primary Synchronization Signal (PSS) or a Secondary Synchronization Signal (SSS).

According to another embodiment of the present disclosure, a storage medium is provided. The storage medium is configured to store program codes for performing a step of transmitting, by a base station, the synchronization signal repeatedly and periodically to a terminal. In one repetition period, the synchronization signal is transmitted over time corresponding to a plurality of Orthogonal Frequency Division Multiplexing (OFDM) symbols in one or more subframes. The synchronization signal is a Primary Synchronization Signal (PSS) or a Secondary Synchronization Signal (SSS).

Optionally, the storage medium is further configured to store program codes such that the synchronization signal is transmitted over time corresponding to m OFDM symbols, where m∈{5, 6, 7, 8, 10, 12}.

Optionally, the storage medium is further configured to store program codes such that the time corresponding to the plurality of OFDM symbols include two portions each corresponding to one sequence. The two portions are divided in order of time. Alternatively, the two portions include time corresponding to OFDM symbols having odd indices and time corresponding to OFDM symbols having even indices. The indices are determined by re-numbering the OFDM symbols corresponding to the synchronization signal from 0 in order of time.

According to another embodiment of the present disclosure, a storage medium is provided. The storage medium is configured to store program codes for performing a step of receiving, by a terminal, the synchronization signal transmitted from a base station repeatedly and periodically. In one repetition period, the synchronization signal is received over time corresponding to a plurality of Orthogonal Frequency Division Multiplexing (OFDM) symbols in one or more subframes. The synchronization signal is a Primary Synchronization Signal (PSS) or a Secondary Synchronization Signal (SSS).

Optionally, the storage medium is further configured to store program codes such that the PSS is in k1 consecutive radio frames and received at a period of T1 radio frames, where T1≥k1, and the SSS is received at a period of T2 radio frames, or the PSS is received at a period of T3 radio frames and the SSS is in k2 consecutive radio frames and received at a period of T4 radio frames, where T4≥k2 or the PSS and the SSS are in k3 consecutive radio frames and received at a period of T5 radio frames, where T5≥k3. Each of k1, k2, k3, T1, T2, T3, T4 and T5 is a positive integer.

Optionally, the storage medium is further configured to store program codes such that in a standalone scenario, no reference signal is received over the OFDM symbols corresponding to the synchronization signal in the one or more subframes in which the synchronization signal is located, or in the standalone scenario, a reference signal is received only over the first q OFDM symbols in the one or more subframes in which the synchronization signal is located, where q is a positive integer.

Optionally, the storage medium is further configured to store program codes such that in one repetition period, the synchronization signal includes a plurality of sequences generated based on a cell identity and/or timing information.

Optionally, the storage medium is further configured to store program codes such that: in one repetition period, each OFDM symbol included in the synchronization signal corresponding to one sequence, or in one repetition period, a plurality of OFDM symbols included in the synchronization signal corresponding to one sequence, and each of the OFDM symbols corresponding to a sub-sequence of the sequence, or in a plurality of subframes in one repetition period, each of the plurality of subframes corresponding to one sequence.

With the embodiments of the present disclosure, a base station transmits a synchronization signal repeatedly and periodically to a terminal. In one repetition period, the synchronization signal is transmitted over time corresponding to a plurality of Orthogonal Frequency Division Multiplexing (OFDM) symbols in one or more subframes. The synchronization signal is a Primary Synchronization Signal (PSS) or a Secondary Synchronization Signal (SSS). Alternatively, a terminal receives a synchronization signal transmitted from a base station repeatedly and periodically. In this way, the problem associated with inappropriate design of the synchronization signals in the NB-LTE system can be solved and proper transmission of the synchronization signals in the narrow band system can be achieved.

BRIEF DESCRIPTION OF THE DRAWINGS

The present disclosure can be further understood with reference to the figures described below, which constitute a part of the present disclosure. The illustrative embodiments of the present disclosure and descriptions thereof are provided for explaining, rather than limiting, the present disclosure. In the figures.

DETAILED DESCRIPTION OF THE EMBODIMENTS

In the following, the present disclosure will be described in detail with reference to the figures, taken in conjunction with the embodiments. The embodiments, and the features thereof, can be combined with each other, provided that they do not conflict.

It is to be noted that, the terms such as "first", "second" and so on in the description, claims and figures are used for distinguishing among similar objects and do not necessarily imply any particularly order or sequence.

Figure 1:
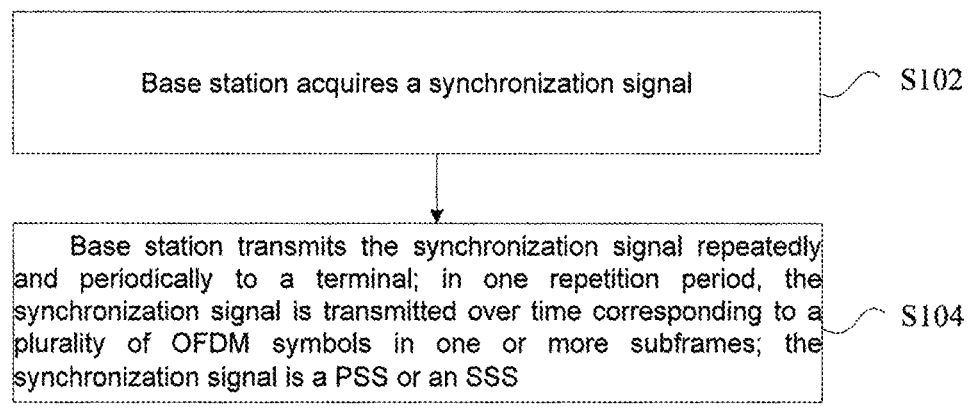
FIG. 1 is a first flowchart illustrating a method for transmission of a synchronization signal according to an embodiment of the present disclosure.

According to an embodiment, a method for transmission of a synchronization signal is provided. FIG. 1 is a first flowchart illustrating a method for transmission of a synchronization signal according to an embodiment of the present disclosure. As shown in FIG. 1, the method includes the following steps.

S102, a base station acquires a synchronization signal.

S104, the base station transmits the synchronization signal repeatedly and periodically to a terminal. In one repetition period, the synchronization signal is transmitted over time corresponding to a plurality of Orthogonal Frequency Division Multiplexing (OFDM) symbols in one or more subframes. The synchronization signal is a Primary Synchronization Signal (PSS) or a Secondary Synchronization Signal (SSS).

With the above steps, the base station transmits the synchronization signal repeatedly and periodically to the terminal. In one repetition period, the synchronization signal is transmitted over time corresponding to a plurality of OFDM symbols in one or more subframes. The synchronization signal is a PSS or an SSS. In this way, the problem associated with inappropriate design of the synchronization signals in the NB-LTE system can be solved and proper transmission of the synchronization signals in the narrow band system can be achieved.

In this embodiment, the step S102 is optional. The solution of this embodiment can include the step S104 only.

In this embodiment, for one subframes, the plurality of OFDM symbols include a plurality of consecutive OFDM symbols in that subframe. Alternatively, when the synchronization signal is transmitted over the one or more subframes, the plurality of OFDM symbols are symbols from a predefined set including the third OFDM symbol, the fourth OFDM symbol and the last two OFDM symbol in each slot.

In this embodiment, the PSS is in k1 consecutive radio frames and transmitted at a period of T1 radio frames, where T1≥k1 and the SSS is transmitted at a period of T2 radio frames. Alternatively, the PSS is transmitted at a period of T3 radio frames and the SSS is in k2 consecutive radio frames and transmitted at a period of T4 radio frames, where T4≥k2. Alternatively, the PSS and the SSS are in k3 consecutive radio frames and transmitted at a period of T5 radio frames, where T5≥k3. Each of k1, k2, k3, T1, T2, T3, T4 and T5 is a positive integer.

In this embodiment, in one repetition period, the synchronization signal includes M OFDM symbols, in which the m-th OFDM symbol has a sub-carrier spacing of $15/A_m$ KHz, where $1 \leq m \leq M$ and each of m, M and $A_m$ is a positive integer.

In this embodiment, when $A_m=2$, the sub-carrier spacing is 7.5 KHz, and the OFDM symbols are two consecutive OFDM symbols including one of: the third OFDM symbol and the fourth OFDM symbol in a slot, or the last two OFDM symbol in a slot. When $A_m=4$, the sub-carrier spacing is 3.75 KHz, and the OFDM symbols are four consecutive OFDM symbols.

Optionally, in a standalone scenario, no reference signal is transmitted over the OFDM symbols corresponding to the synchronization signal in the one or more subframes in which the synchronization signal is located. Alternatively, in the standalone scenario, a reference signal is transmitted only over the first q OFDM symbols in the one or more subframes in which the synchronization signal is located, where q is a positive integer.

In this embodiment, in one repetition period, the synchronization signal includes a plurality of sequences generated based on a cell identity and/or timing information.

In this embodiment, in one repetition period, the synchronization signal includes a plurality of sequences, wherein: in one repetition period, each OFDM symbol included in the synchronization signal corresponds to one sequence; or in one repetition period, a plurality of OFDM symbols included in the synchronization signal correspond to one sequence, and each of the OFDM symbols corresponds to a sub-sequence of the sequence; or in a plurality of subframes in one repetition period, each of the plurality of subframes corresponds to one sequence.

In this embodiment, when each OFDM symbol or a plurality of OFDM symbols, included in the synchronization signal corresponds to a sequence, the sequence is determined based on the OFDM symbol(s) corresponding to the sequence.

In this embodiment, the synchronization signal being transmitted over time corresponding to a plurality of OFDM symbols in one or more subframes in time domain includes: the synchronization signal being transmitted over time corresponding to m OFDM symbols, where $m \in \{5, 6, 7, 8, 10, 12\}$.

In this embodiment, the time corresponding to the plurality of OFDM symbols includes two portions each corresponding to one sequence. The two portions are divided in order of time. Alternatively, the two portions include time corresponding to OFDM symbols having odd indices and time corresponding to OFDM symbols having even indices. The indices are determined by re-numbering the OFDM symbols corresponding to the synchronization signal from 0 in order of time.

In this embodiment, on an OFDM symbol corresponding to the synchronization signal, for a sub-carrier that is not used for transmitting a Cell-specific Reference Signal (CRS), the synchronization signal is y(k) x(k) c, where $c = s(k_0)/x(k_0)$, $k_0$ is a sub-carrier index for CRS in a predetermined Resource Element (RE) on the symbol, $x(k_0)$ is a value of a PSS or SSS sequence corresponding to the sub-carrier # $k_0$, and $s(k_0)$ is a CRS symbol value corresponding to the sub-carrier # $k_0$.

Figure 2:
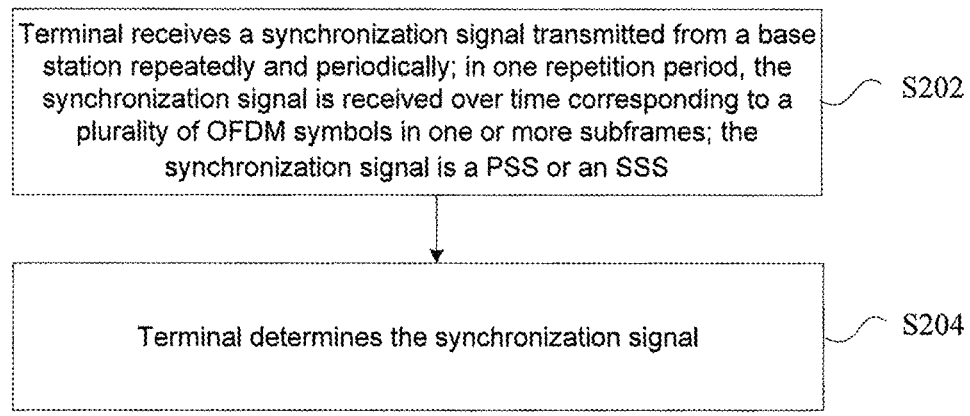
FIG. 2 is a second flowchart illustrating a method for transmission of a synchronization signal according to an embodiment of the present disclosure.

According to an embodiment, a method for transmission of a synchronization signal is also provided. FIG. 2 is a second flowchart illustrating a method for transmission of a synchronization signal according to an embodiment of the present disclosure. As shown in FIG. 2, the method includes the following steps.

S202, a terminal receives a synchronization signal transmitted from a base station repeatedly and periodically. In one repetition period, the synchronization signal is received over time corresponding to a plurality of Orthogonal Frequency Division Multiplexing (OFDM) symbols in one or more subframes. The synchronization signal is a Primary Synchronization Signal (PSS) or a Secondary Synchronization Signal (SSS).

S204, the terminal determines the synchronization signal.

With the above steps, the terminal receives the synchronization signal transmitted from a base station repeatedly and periodically. In one repetition period, the synchronization signal is transmitted over time corresponding to a plurality of OFDM symbols in one or more subframes. The synchronization signal is a PSS or an SSS. In this way, the problem associated with inappropriate design of the synchronization signals in the NB-LTE system can be solved and proper transmission of the synchronization signals in the narrow band system can be achieved.

In this embodiment, the step S204 is optional. The solution of this embodiment can include the step S202 only.

In this embodiment, for one of the one or more subframes, the plurality of OFDM symbols include a plurality of consecutive OFDM symbols in that subframe. Alternatively, when the synchronization signal is received over the one or more subframes, the plurality of OFDM symbols are symbols from a predefined set including the third OFDM symbol, the fourth OFDM symbol and the last two OFDM symbol in each slot.

In this embodiment, the PSS is in k1 consecutive radio frames and received at a period of T1 radio frames, where $T1 \geq k1$, and the SSS is received at a period of T2 radio frames. Alternatively, the PSS is received at a period of T3 radio frames and the SSS is in k2 consecutive radio frames and received at a period of T4 radio frames, where $T4 \geq k2$. Alternatively, the PSS and the SSS are in k3 consecutive radio frames and received at a period of T5 radio frames, where $T5 \geq k3$. Each of k1, k2, k3, T1, T2, T3, T4 and T5 is a positive integer.

In this embodiment, in one repetition period, the synchronization signal includes M OFDM symbols, in which the m-th OFDM symbol has a sub-carrier spacing of $15/A_m$ KHz, where $1 \leq m \leq M$ and each of m, M and $A_m$ is a positive integer.

In this embodiment, when $A_m = 2$, the sub-carrier spacing is 7.5 KHz, and the OFDM symbols are two consecutive OFDM symbols including one of: the third OFDM symbol and the fourth OFDM symbol in a slot, or the last two OFDM symbol in a slot. When $A_m = 4$, the sub-carrier spacing is 3.75 KHz, and the OFDM symbols are four consecutive OFDM symbols.

Optionally, in a standalone scenario, no reference signal is received over the OFDM symbols corresponding to the synchronization signal in the one or more subframes in which the synchronization signal is located. Alternatively, in the standalone scenario, a reference signal is received only over the first q OFDM symbols in the one or more subframes in which the synchronization signal is located, where q is a positive integer.

In this embodiment, in one repetition period, the synchronization signal includes a plurality of sequences generated based on a cell identity and/or timing information.

In this embodiment, in one repetition period the synchronization signal including a plurality of sequences includes: in one repetition period, each OFDM symbol included in the synchronization signal corresponding to one sequence, or in one repetition period, a plurality of OFDM symbols included in the synchronization signal corresponding to one sequence, and each of the OFDM symbols corresponding to a sub-sequence of the sequence, or in a plurality of subframes in one repetition period, each of the plurality of subframes corresponding to one sequence.

In this embodiment, in one repetition period, each OFDM symbol included in the synchronization signal corresponds to one sequence.

In this embodiment, each OFDM symbol included in the synchronization signal corresponds to a ZC sequence having of length of 11. The synchronization signal corresponds to a carrier including 12 sub-carriers.

In this embodiment, when each OFDM symbol, or a plurality of OFDM symbols, included in the synchronization signal corresponds to a sequence, the sequence is determined based on the OFDM symbol(s) corresponding to the sequence.

In this embodiment, the synchronization signal being received over time corresponding to a plurality of OFDM symbols in one or more subframes in time domain includes: the synchronization signal being received over time corresponding to m OFDM symbols, where $m \in \{5, 6, 7, 8, 10, 12\}$.

In this embodiment, the time corresponding to the plurality of OFDM symbols includes two portions each corresponding to one sequence. The two portions are divided in order of time. Alternatively, the two portions include time corresponding to OFDM symbols having odd indices and time corresponding to OFDM symbols having even indices. The indices are determined by re-numbering the OFDM symbols corresponding to the synchronization signal, starting from 0, in order of time.

In this embodiment, on an OFDM symbol corresponding to the synchronization signal, for a sub-carrier that is not used for receiving a Cell-specific Reference Signal (CRS), the synchronization signal is Y(k) x(k) c, where $c = s(k_0)/x$ ($k_0$), $k_0$ is a sub-carrier index for CRS in a predetermined Resource Element (RE) on the symbol, $x(k_0)$ is a value of a PSS or SSS sequence corresponding to the sub-carrier # $k_0$, and $s(k_0)$ is a CRS symbol value corresponding to the sub-carrier # $k_0$.

In this embodiment, the position of the synchronization signal is determined from at least one of: a cell identity; a frequency domain position, a PRB index or a frequency offset corresponding to the synchronization signal.

In this embodiment, the synchronization signal is located in the last N sub-carriers of the PRB in which the synchronization signal is located when the cell identity is X, or in the first N sub-carriers of the PRB in which the synchronization signal is located when the cell identity is Y, where N is a positive integer.

In this embodiment, the cell identity X satisfies mod(X, 3)=0, the cell identity Y satisfies mod(Y, 3)≠0. Alternatively, the cell identity Y satisfies mod(Y, 3)=2, the cell identity X satisfies mod(X, 3)≠2. Alternatively, the cell identity X satisfies mod(X, 6)=0, the cell identity Y satisfies mod(Y, 6)≠0. Alternatively, the cell identity Y satisfies mod(Y, 6)=5, the cell identity X satisfies mod(X, 6)≠5.

In this embodiment, when each OFDM symbol included in the synchronization signal corresponds to one sequence, the sequence is a ZC sequence $$x_u(n) = e^{-j\frac{\pi u n(n+1)}{N}}, 0 \leq n \leq N-1$$

having of length of 11. Different root indices are used on neighboring OFDM symbols, where n denotes an index of a sequence value, u denotes a root index of the ZC sequence, and N denotes a length of the ZC sequence, where N=11.

In this embodiment, the root indices for the ZC sequences divided into groups in accordance with at least one of: a first scheme in which a first group includes ZC sequences having u={5,6,4,7,3,8}, a second group includes ZC sequences having u={2,9}, and a third group includes ZC sequences having u={1,10}, and a second scheme in which a first group includes ZC sequences having u={1,10,2,9,3,8}, a second group includes ZC sequences having u={4,7}, and a third group includes ZC sequences having u={5,6}. The sequences in the second group and the sequences in the third group are inter-exchangeable.

In this embodiment, the first group of ZC sequences are mapped onto first OFDM symbols, the second group of ZC sequences are mapped onto second OFDM symbols, and the third group of ZC sequences are mapped onto third OFDM symbols. The first OFDM symbols include symbols having OFDM symbol index of {5,6,9,10,12,13} in each subframe, the second OFDM symbols include symbols having OFDM symbol index of {3,4} in each subframe, and the third OFDM symbols include symbols having OFDM symbol index of {7,8} in each subframe. The symbol index in a subframe starts from 0.

In this embodiment, the synchronization signal uses the same ZC sequence on the last but two OFDM symbol in a subframe as the ZC sequence used on the last OFDM symbol in the subframe, or as the ZC sequence used on the first OFDM symbol of the second slot, or as the ZC sequence used on the last OFDM symbol of the first slot, or as the ZC sequence used by the synchronization signal on the first OFDM symbol in the subframe.

In this embodiment, for a normal Cyclic Prefix (CP), the root indices of the sequences corresponding to the OFDM symbols included in the synchronization signal are, in order of time, one of:

{1,2,3,4,5,6,7,8,9,10,1};
{1,2,3,4,5,1,6,7,8,9,10};
{1,10,2,9,3,5,8,4,7,5,6};
{1,10,2,9,3,8,4,7,6,5,6};
{2,9,5,6,1,10,4,7,3,8,3};
{2,9,3,8,1,10,4,7,5,6,5}.

In this embodiment, for an extended Cyclic Prefix (CP), the root indices of the sequences corresponding to the OFDM symbols included in the synchronization signal are, in order of time, one of:

{1,2,3,4,5,6,7,8,9};
{1,2,3,4,5,7,8,9,10};
{1,10,2,9, 3,4,7,5,6};
{1,10,2,9,3,8,4,7,6};
{1,5,6,2,9,3,8,4,7};
{1,4,7,2,9,3,8,5,6}.

According to an embodiment of the present disclosure, an apparatus for transmission of a synchronization signal is also provided. The apparatus can implement the above embodiments and preferably embodiments and details thereof will be omitted here. As used hereinafter, the term "module" can be software, hardware, or a combination thereof, capable of performing a predetermined function. While the apparatuses as described in the following embodiments are preferably implemented in software, it can be contemplated that they can also be implemented in hardware or a combination of software and hardware.

Figure 3:
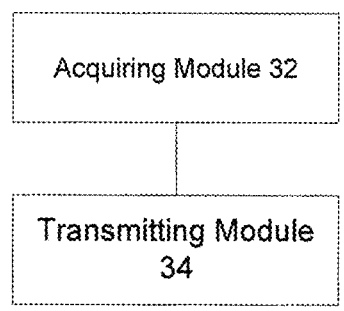
FIG. 3 is a first block diagram showing a structure of an apparatus for transmission of a synchronization signal according to an embodiment of the present disclosure.

FIG. 3 is a first block diagram showing a structure of an apparatus for transmission of a synchronization signal according to an embodiment of the present disclosure. The apparatus can be located at a base station side. As shown in FIG. 3, the apparatus includes:

an acquiring module 32 configured to acquire a synchronization signal; and a transmitting module 34 configured to transmit the synchronization signal repeatedly and periodically to a terminal.

In one repetition period, the synchronization signal is transmitted over time corresponding to a plurality of Orthogonal Frequency Division Multiplexing (OFDM) symbols in one or more subframes. The synchronization signal is a Primary Synchronization Signal (PSS) or a Secondary Synchronization Signal (SSS).

With the above apparatus, the acquiring module 32 is configured to acquire a synchronization signal and the transmitting module 34 is configured to transmit the synchronization signal repeatedly and periodically to the terminal. In one repetition period, the synchronization signal is transmitted over time corresponding to a plurality of OFDM symbols in one or more subframes. The synchronization signal is a PSS or an SSS. In this way, the problem associated with inappropriate design of the synchronization signals in the NB-LTE system can be solved and proper transmission of the synchronization signals in the narrow band system can be achieved.

The solution for transmission of the synchronization in the apparatus is the same as that described in connection with the above embodiments.

In this embodiment, the acquiring module 32 is optional. The solution of this embodiment can include the transmitting module 34 only.

Figure 4:
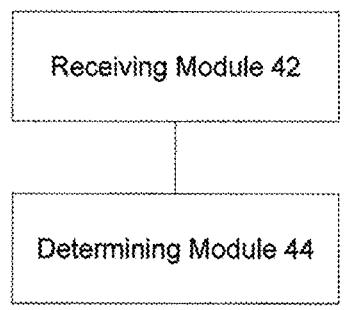
FIG. 4 is a second block diagram showing a structure of an apparatus for transmission of a synchronization signal according to an embodiment of the present disclosure.

FIG. 4 is a second block diagram showing a structure of an apparatus for transmission of a synchronization signal according to an embodiment of the present disclosure. The apparatus can be located at a terminal side. As shown in FIG. 4, the apparatus includes:

a receiving module 42 configured to receive a synchronization signal transmitted from a base station repeatedly and periodically; and a determining module 44 configured to determine the synchronization signal.

In one repetition period, the synchronization signal is transmitted over time corresponding to a plurality of Orthogonal Frequency Division Multiplexing (OFDM) symbols in one or more subframes. The synchronization signal is a Primary Synchronization Signal (PSS) or a Secondary Synchronization Signal (SSS).

With the above apparatus, the receiving module 42 is configured to receive a synchronization signal transmitted from a base station repeatedly and periodically and the determining module 44 is configured to determine the synchronization signal. In one repetition period, the synchronization signal is transmitted over time corresponding to a plurality of OFDM symbols in one or more subframes. The synchronization signal is a PSS or an SSS. In this way, the problem associated with inappropriate design of the synchronization signals in the NB-LTE system can be solved and proper transmission of the synchronization signals in the narrow band system can be achieved.

The solution for transmission of the synchronization signal in the apparatus is the same as that described in connection with the above embodiments.

In this embodiment, the determining module 44 is optional. The solution of this embodiment can include the receiving module 42 only.

In the following, the present disclosure will be described in detail with reference to the preferable embodiments and implementations.

Preferable Embodiment 1

In this preferable embodiment, a method for transmission of a synchronization signal is provided. The synchronization signal is a Primary Synchronization Signal (PSS) or a Secondary Synchronization Signal (SSS).

The synchronization signal is transmitted repeatedly and periodically. For example, the repetition period can be 20 ms, 40 ms, 60 ms or 80 ms. The PSS and the SSS may or may not have the same repetition period. For example, the PSS can have a transmission period of 80 ms and can be transmitted in one or more subframes, and the SSS can have a transmission period of 20 ms and can be transmitted in one or more subframes. A timing of 80 ms can be obtained by receiving the PSS.

The transmission period may not be even. For example, the PSS can be in k1 consecutive radio frames and transmitted at a period of T1 radio frames, where T1≥k1 and the SSS can be transmitted at a period of T2 radio frames. Here, when T1>k1, the PSS may be considered to be transmitted at an uneven period. Alternatively, the PSS can be transmitted at a period of T3 radio frames and the SSS can be in k2 consecutive radio frames and transmitted at a period of T4 radio frames, where T4≥k2. Alternatively, the PSS and the SSS are in k3 consecutive radio frames and transmitted at a period of T5 radio frames, where T5≥k3. Here, each of k1, k2, k3, T1, T2, T3, T4 and T5 is a positive integer. For example, there can be a large transmission period of 80 ms and the PSS or SSS can be transmitted in the first 40 ms of the 80 ms. In the first 40 ms, the PSS or SSS can be transmitted every 10 ms, but is not transmitted in the last 40 ms. A UE can acquire the timing of 80 ms based on the large period, which can save the number of indication bits for system frame number in an MIB.

In one repetition period, resources occupied by the PSS/SSS are as follows.

In one repetition period, the PSS/SSS can occupy one or more subframes. The PSS/SSS can be transmitted in consecutive or inconsecutive subframes. If a subframe for transmission is a Multimedia Broadcast multicast service Single Frequency Network (MBSFN) subframe with a Physical Multicast Channel (PBCH) transmitted in it, the PSS/SSS information will be punctured. Alternatively, the subframe(s) for transmission of the PSS/SSS can be selected from subframes 0, 4, 5 and 9, such that the conflict with the MBSFN subframes can be avoided.

Preferably, the PSS/SSS can be located in subframes 4 and 5 in a radio frame, or subframe 9 in a radio frame and subframe 0 in the next radio frame.

In one repetition period, the PSS/SSS can occupy a number of OFDM symbols in time domain. Here, an OFDM symbol is a symbol currently defined in the LTE. For example, for a normal CP, a subframe of 1 ms can be divided into two slots each of 0.5 ms. The two slots have indices of 0 and 1 and can be referred to as the first slot and the second slot, respectively. Each slot contains seven symbols indexed from 0 to 6, which can be referred to as the first symbol, the second symbol, . . . , the seventh symbol. For an extended CP, a subframe of 1 ms can also be divided into two slots each of 0.5 ms. The two slots have indices of 0 and 1 and can be referred to as the first slot and the second slot, respectively. Each slot contains six symbols indexed from 0 to 5, which can be referred to as the first symbol, the second symbol, . . . , the sixth symbol. In order to avoid any confusion with the OFDM symbol for transmission of the PSS/SSS, in the embodiments of the present disclosure, this OFDM symbol will be referred to as a reference symbol.

Figure 5:
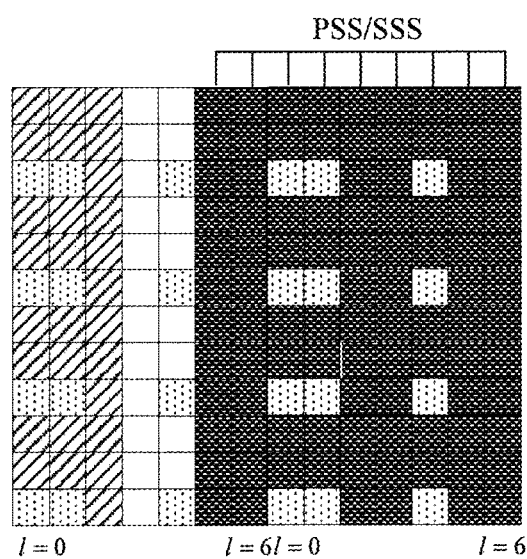
FIG. 5 is a schematic diagram showing consecutive reference symbols occupied by PSS/SSS according to a preferable embodiment of the present disclosure.
Figure 6:
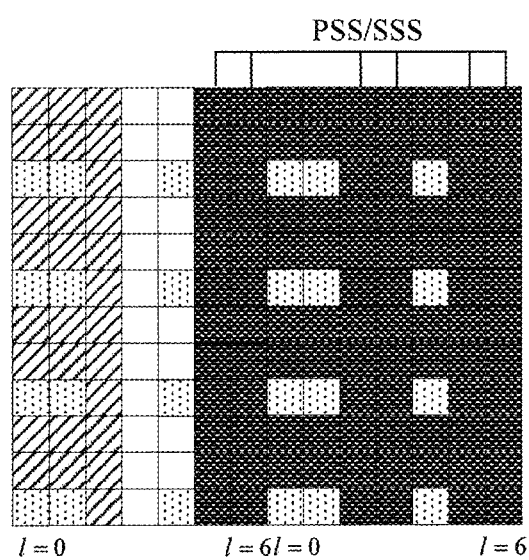
FIG. 6 is a schematic diagram showing inconsecutive reference symbols occupied by PSS/SSS according to a preferable embodiment of the present disclosure.

The PSS/SSS can occupy consecutive reference symbols, or reference symbols not used for transmission of CRS. FIG. 5 is a schematic diagram showing consecutive reference symbols occupied by PSS/SSS according to a preferable embodiment of the present disclosure. FIG. 6 is a schematic diagram showing inconsecutive reference symbols occupied by PSS/SSS according to a preferable embodiment of the present disclosure. As shown in FIG. 5 and FIG. 6, two examples in which two reference symbols are occupied by the PSS/SSS are given, with FIG. 5 showing a consecutive occupation and FIG. 6 showing an inconsecutive occupation.

Preferably, the reference symbols for transmitting the synchronization signal can be selected from a set including the third and fourth reference symbols and the last two reference symbols in each slot. Since the third symbol in a slot having an even index is typically used for PDCCH transmission, such symbol is not included preferably. Further, for the extended CP, the fourth symbol in each slot is CRS, such symbol is not included preferably.

Preferably, the number of reference symbols for transmission of the synchronization signal can be one of 5, 6 and 7.

Alternatively, the number of reference symbols for transmission of the synchronization signal can be one of 8, 10 and 12. Preferably, the synchronization signal can be transmitted on MBSFN subframes. Alternatively, it can be transmitted in subframes in a standalone scenario.

Optionally, if the PSS/SSS occupies the time-frequency resources of a reference signal, the reference signal shall puncture the symbols of the PSS/SSS. The reference signal may include CRS, CSI-RS, PRS, DMRS, or the like.

The PSS and the SSS may or may not occupy the same number of symbols. The PSS and the SSS may or may not occupy the same number of subframes. For example, the PSS can occupy one subframe and the SSS can occupy two subframes.

Optionally, in a standalone scenario, i.e., a scenario without sharing frequency bands with LTE legacy UEs, in the subframes in which the PSS is located, the CRS is not transmitted on the reference symbols in which the synchronization signal is located. As an example, for a normal CP, there are in total 14 reference symbols having indices of 0-13, respectively. The synchronization signal occupies the reference symbols #5-13, then the CRS is not transmitted on the reference symbols #5-13. Alternatively, for the standalone scenario, in the subframes in which the synchronization signal is located, the reference signal is transmitted only in the first q reference symbols, where q is a predetermined positive integer. Preferably, q=1 or 2.

The foregoing has described on which reference symbols the PSS/SSS can be transmitted. In the following, the forms in which the PSS/SSS is transmitted in these reference symbols will be explained.

In one repetition period, the signal form of the PSS/SSS can be as follows.

In one repetition period, the PSS/SSS includes M OFDM symbols, in which the m-th OFDM symbol has a sub-carrier spacing of $15/A_m$ KHz, where $1 \leq m \leq M$ and $A_m$ is a positive integer (e.g., $A_m$=1, 2, 3, 4, 5, 6). Here, the sub-carrier spacing for transmission of the PSS/SSS can be smaller than 15 KHz, i.e., different from the conventional sub-carrier spacing in the LTE.

The M OFDM symbols may or may not have the same sub-carrier spacing. For example, the PSS/SSS can include two OFDM symbols in total. The first OFDM symbol may have a sub-carrier spacing of 15 KHz and may be transmitted on the reference symbol #4 in the first slot. The second OFDM symbol may have a sub-carrier spacing of 7.5 KHz and may be transmitted on the reference symbols #5 and #6 in the first slot.

When $A_m$=1, the sub-carrier spacing is 15 KHz, and the OFDM symbol corresponds to one reference symbol.

When $A_m$=2, the sub-carrier spacing is 7.5 KHz, and the OFDM symbol corresponds to two consecutive reference symbols. That is, one OFDM symbol having a sub-carrier spacing is 7.5 KHz is transmitted in duration of two consecution reference symbols. Preferably, the two consecutive OFDM symbols are one of: the third OFDM symbol and the fourth OFDM symbol in each slot, or the last two OFDM symbol in each slot. Since the third symbol in a slot having an even index is typically used for PDCCH transmission, the third and fourth symbols in the slot having an even index shall not be used. Further, for the extended CP, since the fourth symbol in each slot contains CRS, the OFDM symbol corresponds to the last two symbols in each slot only.

When $A_m$=4, the sub-carrier spacing is 3.75 KHz, and the OFDM symbol corresponds to four consecutive reference symbols. Preferably, the OFDM symbol is transmitted over MBSFN subframes.

In one repetition period, the synchronization signal includes a plurality of sequences generated based on a cell identity and/or timing information. Details of the generation method will be described later.

There are several correspondences between the OFDM symbols and the sequences, as follows.

a) In one repetition period, each OFDM symbol included in the PSS/SSS corresponds to one complete sequence. For example, in one repetition period, the PSS/SSS includes four OFDM symbols each corresponding to one complete sequence.

b) Alternatively, in one repetition period, a plurality of OFDM symbols included in the synchronization signal correspond to one complete sequence. Each of the OFDM symbols corresponding to a sub-sequence of the complete sequence. For example, in one repetition period, the PSS/SSS includes eight OFDM symbols. Four symbols correspond to one complete sequence, which can be divided into four segments each corresponding to one symbol.

c) Alternatively, in a plurality of subframes in one repetition period, each of the plurality of subframes corresponds to one sequence.

In one repetition period, the mapping relationship between the resources occupied by the PSS/SSS and the sequences can be as follows.

When the synchronization signal is transmitted over time corresponding to 5, 6 or 7 reference symbols, the time corresponding to the reference symbols can be divided into two portions each corresponding to one complete sequence.

The two portions can be divided in order of time. For example, when the synchronization signal is transmitted over time corresponding to five reference symbols, one portion may include the time corresponding to the first three reference symbols and the other portion may include the time corresponding to the remaining two reference symbols. Alternatively, one portion may include the reference symbols in a slot having an even index, and the portion may include the reference symbols in a slot having an odd index. In a case where the synchronization signal is transmitted over time corresponding to 5 or 7 reference symbols, each sequence may occupy a portion in frequency domain in the middle one of the reference symbols.

Alternatively, the two portions include time corresponding to OFDM symbols having odd indices and time corresponding to OFDM symbols having even indices. The indices are determined by re-numbering the OFDM symbols corresponding to the synchronization signal from 0 in order of time. For example, when the synchronization signal is transmitted over time corresponding to six reference symbols having indices of 0-5, respectively, one portion may include the reference symbols #0, 2 and 4, and the other portion may include the remaining symbols.

Alternatively, one of the two portions may include the reference symbols in which the CRS is located, and the other may include the remaining reference symbols. That is, one portion may include the one or more of the first, second and last but two symbols in each slot, and the other portion may include one or more of the remaining reference symbols.

Preferable Embodiment 2

In this embodiment, a method for transmission of PSS is provided.

In one repetition period, the PSS can occupy one or more subframes. Preferably, the PSS can be located in subframes 4 and 5 in a radio frame, or subframe 9 in a radio frame and subframe 0 in the next radio frame.

In one repetition period, the PSS can be located in a plurality of reference symbols in one or more subframes. For example, in one repetition period, the PSS can occupy n (n>1) reference symbols in one subframe. Alternatively, in one repetition period, the PSS can occupy a plurality of subframes and in each of the subframes the PSS may occupy one or more reference symbols. The number of reference symbols occupied by the PSS may or may not be the same in these subframes. For example, for a normal CP, other than the first three reference symbols that may be used for PDCCH, the reference symbols available for the PSS in one subframe include the reference symbols 3, 5 and 6 in the slot having an even index and the reference symbols 2, 3, 5, and 6 in the slot having an odd index. For an extended CP, other than the first three reference symbols that may be used for PDCCH, the reference symbols available for the PSS in one subframe include the reference symbols 2, 4 and 5 in the slot having an even index and the reference symbols 2, 3, 5, and 6 in the slot having an odd index. Without the interference from the CRS, an improved synchronization performance can be achieved. Alternatively, the PSS can be located in the reference symbols in which the CRS is located. In the positions for transmitting the CRS, the PSS symbols will be punctured for transmission of the CRS.

Optionally, the eNB can configure the subframe(s) for transmitting the PSS as MBSFN subframe(s), so as to reduce the interference with the synchronization channels from the CRS.

As in the embodiment 1, in one repetition period, the PSS includes M OFDM symbols, in which the m-th OFDM symbol has a sub-carrier spacing of $15/A_m$ KHz, where and $1 \leq m \leq M$ and $A_m$ is a positive integer (e.g., $A_m$=1, 2, 3, 4, 5, 6). One or more OFDM symbols correspond to one sequence, which can be a ZC sequence, an M sequence, or wash sequence. This embodiment is not limited to any of these sequences.

Assuming that the PSS has a bandwidth of 180 KHz and each sub-carrier has a width of 15 KHz, there can be in total 12 sub-carriers. In this case, a ZC sequence having a length of 11, 12 or 13 (in this case one symbol is to be punctured according to a predefined rule to obtain a sequence having a length of 12). In practice, the length is not limited to any of the values mentioned above. Alternatively, each sub-carrier may have a width of 7.5 KHz, resulting in 24 sub-carriers in total. In this case, a ZC sequence having a length of 13, 14 or 25 (in this case one symbol is to be punctured according to a predefined rule to obtain a sequence having a length of 24). In practice, the length is not limited to any of the values mentioned above. Preferably, when the ZC sequence is generated in frequency domain, the symbol corresponding to the DC position is to be punctured. For example, when the sequence has a length of 11, the symbol in the middle will be punctured.

The sequences corresponding to the OFDM symbols of the PSS may or may not be the same.

Optionally, the PSS includes a sequence and its conjugate.

For example, if the PSS occupies 8 symbols in one subframe, then the first 4 symbols each correspond to a sequence s, and the last 4 symbols each correspond to a sequence that is the conjugate of s.

Alternatively, the first 4 symbols correspond to a long sequence having a length of e.g., 47, and the last 4 symbols also have a length of 47 and correspond to the conjugate of the long sequence.

The transmission sequences for the PSS can be the same for all cells. That is, the PSS is used for timing only, without carrying any other information. Alternatively, the PSS may carry some information.

The PSS can be used to indicate a portion of cell identity information, e.g., $N_{ID}^{cell}=3N_{ID}^{(1)}+N_{ID}^{(2)}$, where $N_{ID}^{cell}$ is a cell identity, $N_{ID}^{(1)}$ is a value ranging from 0 to 167 and ID is a value ranging from 0 to 2.

For example, $N_{ID}^{(2)}$ can be represented by three different ZC sequences, namely ZC1, ZC2 and ZC3. For $N_{ID}^{(2)}=i$, each of the n symbols for transmitting the PSS carries ZCi. The three different ZC sequences have different root sequences, or the same or partially same root sequence but different cyclic shifts.

Alternatively, $N_{ID}^{(2)}$ can be represented by different orders of the sequences. For example, assuming that the PSS is transmitted over 9 symbols, every 3 out of the 9 symbols correspond to the same sequence. Accordingly, there are 3 sequences, namely ZC1, ZC2 and ZC3. For example, if $N_{ID}^{(2)}=0$, the sequences corresponding to the 9 symbols are in the order of ZC1 (first 3 symbols), ZC2 (middle 3 symbols) and ZC3 (last 3 symbols). If $N_{ID}^{(2)}=1$, the sequences corresponding to the 9 symbols are in the order of ZC2 (first 3 symbols), ZC3 (middle 3 symbols) and ZC1 (last 3 symbols). If $N_{ID}^{(2)}=1$, the sequences corresponding to the 9 symbols are in the order of ZC3 (first 3 symbols), ZC1 (middle 3 symbols) and ZC2 (last 3 symbols).

Preferable Embodiment 3

In this embodiment, a method for transmission of SSS is provided.

The SSS is transmitted repeatedly at a repetition period of e.g., 20 ms, 40 ms or 60 ms. In practice, the period is not limited to any of these values.

In one repetition period, the SSS can be located in a plurality of reference symbols, e.g., reference symbols that do not contain CRS. For example, for a normal CP, other than the first three reference symbols that may be used for PDCCH, the reference symbols available for the SSS in one subframe include the reference symbols 3, 5 and 6 in the slot having an even index and the reference symbols 2, 3, 5, and 6 in the slot having an odd index. For an extended CP, other than the first three reference symbols that may be used for PDCCH, the reference symbols available for the SSS in one subframe include the reference symbols 2, 4 and 5 in the slot having an even index and the reference symbols 2, 3, 5, and 6 in the slot having an odd index. Without the interference from the CRS, an improved synchronization performance can be achieved. Alternatively, the SSS can be located in the reference symbols in which the CRS is located. In the positions for transmitting the CRS, the SSS symbols will be punctured for transmission of the CRS.

As in the embodiment 1, in one repetition period, the SSS includes M OFDM symbols, in which the m-th OFDM symbol has a sub-carrier spacing of $15/A_m$ KHz, where $1 \leq m \leq M$ and $A_m$ is a positive integer (e.g., $A_m$=1, 2, 3, 4, 5, 6). The PSS on each OFDM symbol corresponds to one sequence, which can be a ZC sequence, an M sequence, or wash sequence. This embodiment is not limited to any of these sequences.

Without loss of generality, in this embodiment, it is assumed that the PSS has the same sub-carrier spacing as the LTE, i.e., 15 KHz. In practice, this embodiment is not limited to this specific sub-carrier spacing.

Assuming that the SSS is transmitted over M OFDM symbols, without loss of generality, it is assumed that each symbol carries one sequence, which can be a ZC sequence or m sequence. Preferably, a ZC sequence is selected. In practice, a plurality of OFDM symbols may correspond to one sequence. The present disclosure is not limited to this.

For example, the SSS is transmitted over 6 OFDM symbols in one subframe and thus corresponds to 6 ZC sequences, or over 12 OFDM symbols in two consecutive subframes and thus corresponds to 12 ZC sequences. In practice, this embodiment is not limited to these values. The M ZC sequences can be used to indicate different cell identity information and timing information. Here, the timing information will be explained as an example. For example, when the ZC sequence is transmitted at a period of 20 ms, the timing information can indicate the position information of the current 20 ms in 80 ms, using e.g., 2 bits. In this way, upon receiving the SSS, the UE can acquire the timing of 80 ms.

In the LTE, the cell identity has a value ranging from 0 to 503. If the entire cell identity is to be indicated by the SSS, 9 bits will be needed. With the additional 2-bit information for timing, the SSS needs to indicate in total 11 bits of information.

Several schemes for the ZC sequences to carry the information will be given below.

1. The information can be carried by a combination of the sequences over the symbols.

The M OFDM symbols correspond to M sequences, respectively, which are assumed to be six ZC sequences, without loss of generality, as follows:

$$ZC_{u_i}(n) = \exp\left(-\frac{j\pi u_i n(n+1)}{N_{zc}}\right),$$
$$n = 0, 1, \ldots, N_{zc} - 1$$

where $N_{ZC}=11$ is the length of the ZC sequence, $u_i \in \{1, 2, \ldots, N_{ZC}-1\}$ is an index of a root sequence of the ZC sequence on the i-th symbol.

Hence, a combination of $(u_1, u_2, \ldots, u_6)$ can indicate the cell identity and/or the timing information.

Assuming that the cell identity corresponds to a ZC sequence having a length of 11, there are 10 ZC root sequences. Hence, a combination of $(u_1, u_2, \ldots, u_6)$ is sufficient to indicate 11 bits of information. Optionally, the set of $u_i$ can be a subset of the set $\{1, 2, \ldots, N_{ZC}-1\}$.

An example is given here for explaining how the indication is provided. For example, the SSS is only used to indicate the cell identity information. The SSS includes 6 ZC sequences. There are 3 root sequence indices in the set of $u_i$, which are re-numbered to have indices of 0, 1 and 2, respectively. Then, the 6 ZC sequences can be used to indicate $3^6$ (i.e., 729) states, which is sufficient to indicate the cell identities. Then, the cell identity satisfies:

$$n_{ID}^{cell} = \sum_{i=0}^{5} w_i * 3^i$$

where $w_i$ is an index of a root sequence of the ZC sequence on the (i+1)-th symbol and has a value of 0, 1 or 2.

Alternatively, the root sequences and cyclic shifts can be used for joint indication, e.g., using $(u_1, CS_1, u_2, CS_2, \ldots, u_6, CS_6)$ to jointly indicate the cell identity and the timing information. Here, $CS_1, CS_2, \ldots, CS_6$ are cyclic shift values for the ZC sequence on the i-th symbol out of the 6 symbols, respectively.

2. Two long sequences over two subframes are used for indication.

The SSS is transmitted over two subframes. Preferably, two consecutive subframes, e.g., subframes #4 and #5, or subframe #9 and subframe #0 in the next radio frame, can be selected. On each subframe, the SSS is a sequence and occupies e.g., a plurality of reference symbols. This long sequence is segmented in time domain and then transmitted over the plurality of reference symbols, respectively, with a sub-carrier spacing of 15 KHz. The long sequence over the two subframes is designed for indicating the information, which will be described in detail below.

For example, in each subframe, 6 reference symbols, i.e., 72 REs, are occupied. The SSS is a ZC sequence having a length of 71, as follows:

$$ZC_{u_i}(n) = \exp\left(-\frac{j\pi u_i n(n+1)}{N_{zc}}\right),$$
$$n = 0, 1, \ldots, N_{zc} - 1.$$

The ZC sequence is generated in time domain. Here, $N_{ZC}=71$ is the length of the ZC sequence, and $u_i \in \{1, 2, \ldots, N_{ZC}-1\}$ is an index of the root sequence of the ZC sequence on the i-th subframe out of the two subframes.

An example is given here for explaining how the indication is provided. For example, the SSS is only used to indicate cell identity information and 2-bit timing information, i.e., 11 bits of information in total. The two subframes correspond to two sequences, respectively. There are 70 root sequence indices in the set of which are re-numbered to have indices of 0, 1, 2, . . . 69, respectively. Then, the 2 ZC sequences can be used to indicate $70^2$ (i.e., 4900) states, which is sufficient to indicate the 11 bits of information ($2^{11}$=4096). Then, the cell identity satisfies:

$$n_{ID}^{cell} = \sum_{i=0}^{1} w_i * 70^i$$

where $w_i$ is an index of a root sequence of the ZC sequence on the (i+1)-th subframe out of the two subframes and has a value of 0, 1, 2, . . . , 69.

Alternatively, the root sequences and cyclic shifts can be used for joint indication, e.g., using $(u_1, CS_1, u_2, CS_2)$ to jointly indicate the cell identity and the timing information. Here, $CS_1$ and $CS_2$ are cyclic shift values for the ZC sequence on the i-th subframe out of the two subframes, respectively. Further, the information can be indicated by means of change in transmission subframes. For example, the SSS is transmitted every 40 ms, in the radio frame satisfying $n_f$ mod 8=0, the sequence A of the SSS is transmitted in subframe #4 and the sequence B of the SSS is transmitted in subframe #5. In the radio frame satisfying $n_f$ mod 8=1, the sequence B of the SSS is transmitted in subframe #4 and the sequence A of the SSS is transmitted in subframe #5. In this way, the timing of 80 ms can be obtained.

3. Difference mapping positions are used to carry the information.

In one repetition period, the SSS can include one or more sequences each generated from a plurality of sub-sequences. The information can be indicated by means of different mapping positions of the plurality of sub-sequences.

For example, each sequence of the SSS can be generated from e.g., two sequences denoted as $s_0(n)$ and $s_1(n)$.

If $n_f/2$ mod 2=0, then:

$$d(2n)=s_0(n), d(2n+1)=s_1(n); \quad (1)$$

If $n_f/2$ mod 2=1, then:

$$d(2n+1)=s_0(n), d(2n)=s_1(n), \quad (2)$$

where $n_f$ is an index of a radio frame. For example, at radio frame 4n, a sequence according to Equation (1) can be transmitted. At radio frame 4n+2, a sequence according to Equation (2) can be transmitted. In this way, the timing of 40 ms can be obtained. $s_0(n)$ and $s_1(n)$ can be generated from cell identities. For example, there can be a one-to-one correspondence between the cell identities and the root sequences of the ZC sequences and the cyclic shifts.

Preferable Embodiment 4

In this embodiment, a method for transmission of PSS/SSS over the reference symbols in which the CRS is located.

When the PSS/SSS is on the reference symbols in which the CRS is located, the symbols of the PSS/SSS are punctured at the RE positions in which the CRS is located.

Without loss of generality, on a reference symbol in which the CRS is transmitted, the PSS/SSS sequences are x(0), x(1), x(2) . . . x(K 1), K=12, where 0, 1, . . . , K−1 denote indices of sub-carriers. For an RE that is not used for transmitting the CRS, the PSS/SSS transmitted from the eNB is y(k) x(k) c, where c=s($k_0$)/x($k_0$), $k_0$ is a sub-carrier index for CRS in a predetermined RE on the symbol, x($k_0$) is a value of a PSS/SSS sequence corresponding to the sub-carrier # $k_0$, and s($k_0$) is a CRS symbol value corresponding to the sub-carrier # $k_0$.

In this way, it is possible to ensure the PSS/SSS symbol value at the position at which the CRS is transmitted on the sub-carrier # $k_0$ to be valid, and the PSS/SSS symbol value at other positions at which the same CRS value is transmitted on the sub-carrier # $k_0$ to be valid too.

Preferably, the transmission power of the PSS/SSS is the same as that of the CRS.

Preferable Embodiment 5

In this embodiment, a method for transmission of a synchronization signal is provided.

In this embodiment, the synchronization signal includes a plurality of OFDM symbols each corresponding to one sequence. The OFDM symbols occupied by the synchronization signal are OFDM symbols defined in the current LTE system, i.e., symbols each having a sub-carrier spacing of 15 KHz.

Assuming a sequence length of 11, there are in total 10 sequences available. In practice, the sequence length is not limited to this. It is assumed that the available sequences are ZC sequences, as follows:

$$x_u(n) = e^{-j\frac{\pi u n(n+1)}{N}}, 0 \le n \le N-1$$

where N denotes the sequence length, which is 11 in this case, and u is a root sequence index having a value ranging from 1 to 10. In accordance with anti-frequency-offset performances of the ZC sequences, the root indices at both ends correspond to worse anti-frequency-offset performances and the root indices in the middle correspond to better anti-frequency-offset performances. That is, the root indices can be ordered depending on their anti-frequency-offset performances as:

$$\left(\frac{N-1}{2}, \frac{N+1}{2}\right) > \left(\frac{N-1}{2}-1, \frac{N+1}{2}+1\right) >$$
$$\left(\frac{N-1}{2}-2, \frac{N+1}{2}+2\right) > \ldots \left(\frac{N-1}{2}-i, \frac{N+1}{2}+i\right) \ldots > 1, N,$$

where i is a positive integer smaller than $$\frac{N-1}{2}.$$

The two root indices in each pair of parentheses have similar performances. For N=1, (5, 6)>(4,7)>(3,8)>(2,9)>(1,10).

Optionally, the sequences having good anti-frequency-offset performances can be placed on symbols without CRS. Preferably, a pair of sequences having good anti-frequency-offset performances can be placed on two physically adjacent symbols without CRS, e.g., the last two symbols in one slot in an LTE subframe. The present disclosure is not limited to this example.

Assuming a normal CP, one subframe contains 14 symbols numbered as 0, 1, 2, 3, . . . , 13 in order of time. The symbols with CRS are symbols having indices of 0, 1, 4, 7, 8 and 11, and the remaining symbols do not have CRS. It is assumed that the synchronization signal occupies the last 11 symbols. In practice, the number and positions of the symbols are not limited to the above example. Then, the sequences having good anti-frequency-offset performances can be placed on a pair of adjacent symbols without CRS. That is, the root sequence indices of 5, 6, 4, 7, 3 and 8 can be placed on the symbols #5, 6, 9, 10, 12 and 13, respectively, in a one-to-one correspondence. The present disclosure is not limited to any specific correspondence. For example, the sequence having a root sequence index of 5 can be transmitted on symbol #5. The sequence having a root sequence index of 6 can be transmitted on symbol #6. The sequence having a root sequence index of 4 can be transmitted on symbol #9. The sequence having a root sequence index of 7 can be transmitted on symbol #10. The sequence having a root sequence index of 3 can be transmitted on symbol #12. The sequence having a root sequence index of 8 can be transmitted on symbol #13. Other sequences can be mapped onto the symbols with CRS. In an example, the 11 symbols, i.e., symbols #3-13, correspond to the root sequence indices of 2, 9, 3, 8, 1, 10, 4, 7, 5, 6 and 5, respectively. Table 1 gives some examples of the root sequence indices. In practice, the present disclosure is not limited to the examples below.

TABLE 1

| Symbol Index | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| CRS (Y/N) | Y | Y | N | N | Y | N | N | Y | Y | N | N | Y | N | N |
| Root Sequence Index (Example 1) | | | 2 | 9 | 3 | 8 | 1 | 10 | 4 | 7 | 5 | 6 | 5 | |
| Root Sequence Index (Example 2) | | | 2 | 9 | 5 | 6 | 1 | 10 | 4 | 7 | 3 | 8 | 3 | |

Some more examples will be given below. The root sequence indices on the 11 symbols can be, in order of time, one of:

{1,2,3,4,5,6,7,8,9,10,1};
{1,2,3,4,5,1,6,7,8,9,10};
{1,10,2,9,3,5,8,4,7,5,6};
{1,10,2,9,3,8,4,7,6,5,6};
{2,9,5,6,1,10,4,7,3,8,3};
{2,9,3,8,1,10,4,7,5,6,5}.

Optionally, adjacent symbols correspond to a pair of conjugate sequences, i.e., $$\left(\frac{N-1}{2}-i, \frac{N+1}{2}+i\right),$$

where i is a positive integer smaller than $$\frac{N-1}{2}.$$

As shown in Table 1, symbols #3 and #4 correspond to 2 and 9. In practice, the order can be changed into 9 and 2. Alternatively, the symbols can correspond to other conjugate sequences, e.g., 5 and 6.

Preferably, adjacent symbols without CRS correspond to a pair of conjugate sequences.

Optionally, the 11 symbols correspond to in total 10 different root sequences. A sequence on one symbol is the same as sequences on other symbols. It is referred to as a repetitive sequence. Preferably, the sequence on the last but two symbol is the same the sequences on other symbols. Preferably, the repetitive sequence is one of the sequences having the best anti-frequency-offset performances, e.g., one of $$\left(\frac{N-1}{2}, \frac{N+1}{2}\right).$$

Alternatively, the repetitive sequence can be the sequence on the last symbol, the first symbol, the first symbol in the second slot, or the third symbol in the second slot.

Assuming an extended CP, one subframe contains 12 symbols numbered as 0, 1, 2, 3, . . . , 11 in order of time. The symbols with CRS are symbols having indices of 0, 1, 3, 6, 7 and 9, and the remaining symbols do not have CRS. Then, the sequences having good anti-frequency-offset performances can be placed on a pair of adjacent symbols without CRS. That is, the root sequence indices of 5, 6, 4, and 7 can be placed on the symbols #4, 5, 10 and 11, respectively, in a one-to-one correspondence. The present disclosure is not limited to any specific correspondence. For example, the sequence having a root sequence index of 5 can be transmitted on symbol #4. The sequence having a root sequence index of 6 can be transmitted on symbol #5. The sequence having a root sequence index of 10 can be transmitted on symbol #7. The sequence having a root sequence index of 4 can be transmitted on symbol #11. In an example, the 9 symbols correspond to the root sequence indices of 1, 5, 6, 2, 9, 3, 8, 4 and 7, respectively. Table 2 gives some examples of the root sequence indices. In practice, the present disclosure is not limited to the examples below.

TABLE 2

| Symbol Index | 0 | 1 | 2 | 3 | 4 | 5 | 6 | 7 | 8 | 9 | 10 | 11 |
|---|---|---|---|---|---|---|---|---|---|---|---|---|
| CRS (Y/N) | Y | Y | N | Y | N | N | Y | Y | N | Y | N | N |
| Root Sequence Index (Example 1) | | | 1 | | 5 | 6 | | | 2 | 9 | 3 | 8 | 4 | 7 |
| Root Sequence Index (Example 2) | | | 10 | | 5 | 6 | | | 2 | 9 | 3 | 8 | 4 | 7 |
| Root Sequence Index (Example 3) | | | 6 | | 5 | 6 | | | 2 | 9 | 3 | 8 | 4 | 7 |

Some more examples will be given below. The root sequence indices on the 9 symbols can be, in order of time, one of:

{1,2,3,4,5,6,7,8,9};
{1,2,3,4,5,7,8,9,10};
{1,10,2,9,3,4,7,5,6};
{1,10,2,9,3,8,4,7,6};
{1,5,6,2,9,3,8,4,7};
{1,4,7,2,9,3,8,5,6}.

Optionally, the 9 symbols correspond to 9 different root sequences in total (i.e., each symbol corresponds to a unique root sequence), which can be the 9 root sequences having the best anti-frequency-offset performances. For example, the 9 different root sequences can be 9 root sequences other than the one having an index of 1, or 9 root sequences other than the one having an index of 9.

Optionally, the sequences having good anti-frequency-offset performances can be placed on the symbols with CRS. For a normal CP, the 11 symbols correspond to the root sequences having indices of 4, 7, 1, 10, 5, 6, 2, 9, 8, 3 and 8, respectively. For an extended CP, the symbols correspond to the root sequences having indices of 6, 1, 10, 4, 7, 3, 8, 2 and 9.

Optionally, the sequences can be divided into groups and the sequences to be protected can be placed on the symbols without CRS. The sequences to be protected can be sequences having good or bad anti-frequency-offset performances. The symbols without CRS in which the sequences to be protected are located can be selected arbitrarily.

Optionally, the root indices for the ZC sequences divided into groups in accordance with at least one of:

a first scheme in which a first group includes ZC sequences having u={5,6,4,7,3,8}, a second group includes ZC sequences having u={2,9}, and a third group includes ZC sequences having u={1,10}, and a second scheme in which a first group includes ZC sequences having u={1,10,2,9,3,8}, a second group includes ZC sequences having u={4,7}, and a third group includes ZC sequences having u={5,6}.

The sequences in the second group and the sequences in the third group are inter-exchangeable.

The first group of ZC sequences can be mapped onto first OFDM symbols, the second group of ZC sequences can be mapped onto second OFDM symbols, and the third group of ZC sequences can be mapped onto third OFDM symbols. The first OFDM symbols include symbols having numbers of {5,6,9,10,12,13} in the subframe, the second OFDM symbols include symbols having numbers of {3,4} in the subframe, and the third OFDM symbols include symbols having number of {7,8} in the subframe.

Embodiment 6

Similar to the embodiment 5, for a normal CP, the last 11 symbols in a subframe are used for transmission of the synchronization signal. The root sequence indices for the sequences corresponding to the 11 symbols can be cyclic in order, i.e., 1, 2, 3, 4, 5, 6, 7, 8, 9, 10 and x, where x is any arbitrary one in the range from 1 to 10. Preferably, the root sequence index x for the sequence on the last symbol can be 1, 5, or 6.

Optionally, the sequences on the symbols can be end-to-end conjugate, e.g., 1, 2, 3, 4, 5, x, 6, 7, 8, 9 and 10, where x is any arbitrary one in the range from 1 to 10. Preferably, the root sequence index x for the sequence on the last symbol can be 1, 5, or 6.

Optionally, among the sequences on the symbols, the sequences on adjacent symbols are conjugate with each other. The repetitive sequence is on the symbol in the middle. For example, for 1, 10, 2, 9, 3, x, 8, 4, 7, 5 and 6, x is the repetitive sequence in the middle symbol between a pair of conjugate sequences. Preferably, the sequence x on the last symbol can be 1, 5, or 6.

Optionally, the sequences on the symbols correspond to a pair of conjugate sequences. For example, the first 5 symbols correspond to the root sequence indices of $$\frac{N-1}{2} - i.$$

and the last 6 symbols correspond to the root sequence indices of $$\frac{N+1}{2} + i.$$

Embodiment 7

In this embodiment, the synchronization signal includes a plurality of OFDM symbols each corresponding to one sequence. The OFDM symbols occupied by the synchronization signal are OFDM symbols defined in the current LTE system, i.e., symbols each having a sub-carrier spacing of 15 KHz.

In this embodiment, the PSS and/or SSS is transmitted over 11 sub-carriers. A downlink carrier includes 12 sub-carriers, and may be used for transmitting downlink information in the NB-IoT system. In practice, it is not limited to the NB-IoT system. In this embodiment, positions of these 11 sub-carriers in the downlink carrier are provided.

Optionally, the 11 sub-carriers are 11 ones having the lowest frequencies of the 12 sub-carriers, or are 11 ones having the highest frequencies of the 12 sub-carriers.

Optionally, the positions of the 11 sub-carriers are determined by cell identities, thereby reducing collision probability between the synchronization signal and the CRS. For example, when the cell identity mod 3 is 0, the 11 sub-carriers are 11 ones having the highest frequencies of the 12 sub-carriers. When the cell identity mod 3 is 2, the 11 sub-carriers are 11 ones having the lowest frequencies of the 12 sub-carriers. When the cell identity mod 3 is 1, the 11 sub-carriers are 11 ones having the lowest or the highest frequencies of the 12 sub-carriers. In this way, the CRS at most occupies 3 REs over the symbol in which the synchronization signal is located.

Figure 7:
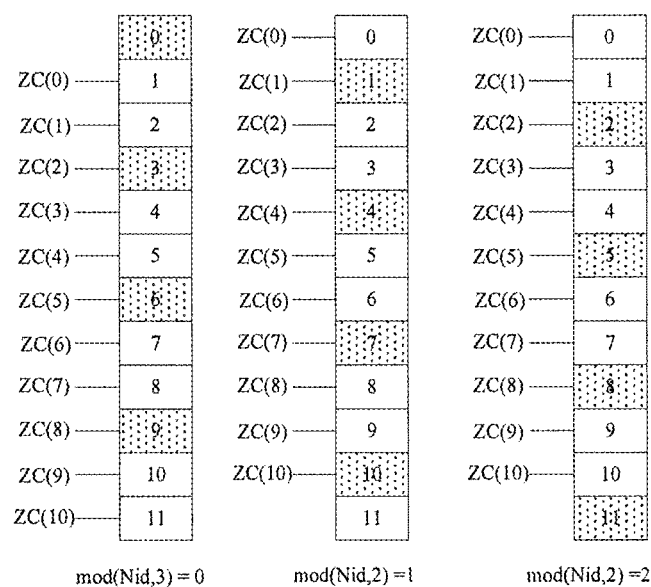
FIG. 7 is a schematic diagram showing REs corresponding to ZC sequences according to a preferable embodiment of the present disclosure.

FIG. 7 is a schematic diagram showing REs corresponding to ZC sequences according to a preferable embodiment of the present disclosure. As shown in FIG. 7, an example is given, in which "mod" indicates modulo, REs in the dotted part are those where the CRS is located, and Nid denotes a cell identity. REs corresponding to ZC sequences are illustrated in FIG. 7.

Alternatively, when the cell identity mod 6 is 0, the 11 sub-carriers are 11 ones having the highest frequencies of the 12 sub-carriers, and when the cell identity mod 6 is 2, the 11 sub-carriers are 11 ones having the lowest frequencies of the 12 sub-carriers. When the cell identity mod 6 is another value, the 11 sub-carriers are 11 ones having the lowest frequencies or the highest frequencies of the 12 sub-carriers.

Optionally, the positions of the 11 sub-carriers are determined by positions of the 12 sub-carriers and/or a frequency offset of the center frequency of the 12 sub-carriers from the integer multiple of the nearest 100 kHz. For example, for the in-band mode, the positions of the 11 sub-carriers are determined by PRB indices corresponding to the 12 sub-carriers or a frequency offset of the center frequency of the PRBs from the integer multiple of the nearest 100 kHz. Table 3 shows positions of the 11 sub-carriers at the odd-numbered bandwidth. As shown in Table 3, when the system bandwidth is 5 MHz, if the synchronization signal is transmitted over PRB #17 or 22, the PSS is transmitted over 11 sub-carriers having the lowest frequencies in the PRB. If the synchronization signal is transmitted over PRB #2 or 7, the PSS is transmitted over 11 subcarriers having the highest frequencies in the PRB. This is similar for the remaining system bandwidth. In this manner, it is possible to receive the PSS without a fixed frequency offset. It is also similar for guard band.

TABLE 3

| System Bandwidth | 3 MHz | 12 | 2 |
|---|---|---|---|
| | 5 MHz | 17, 22 | 2, 7 |
| | 15 MHz | 42, 47, 52, 57, 62, 67, 72 | 2, 7, 12, 17, 22, 27, 32 |
| Frequency Offset obtained by subtracting the central frequency of the PRB from the integer multiple of the nearest 100 kHz | | −7.5 kHz | +7.5 kHz |
| Positions of the 11 sub-carriers | | 11 sub-carriers having the lowest frequencies in the PRB | 11 sub-carriers having the highest frequencies in the PRB |

The following Table 4 shows positions of the 11 sub-carriers at the even-numbered bandwidth.

TABLE 4

| System Bandwidth | 10 MHz | 4, 9, 14, 19, | 30, 35, 40, 45 |
|---|---|---|---|
| | 20 MHz | 4, 9, 14, 19, 24, 29, 34, 39, 44, | 55, 60, 65, 70, 75, 80, 85, 90, 95 |
| Frequency Offset obtained by subtracting the central frequency of the PRB from the integer multiple of the nearest 100 kHz | | −2.5 kHz | +2.5 kHz |
| Positions of the 11 sub-carriers | | 11 sub-carriers having the lowest frequencies in the PRB | 11 sub-carriers having the highest frequencies in the PRB |

Optionally, when the center frequency of the 11 sub-carriers is smaller than the integer multiple of the nearest 100 kHz, the 11 sub-carriers are 11 ones having the highest frequencies of the 12 sub-carriers. When the center frequency of the 12 sub-carriers is larger than the integer multiple of the 12 sub-carriers, the 11 sub-carriers are 11 ones having the lowest frequencies of the 12 sub-carriers.

Optionally, the eNB transmits the sequence over 11 consecutive sub-carriers. Alternatively, a sequences value over certain sub-carrier may be punctured. For example, the middlemost sequence value may be punctured. Then, no signal can be transmitted over the middlemost sub-carrier among the consecutive 11 sub-carriers, and corresponding sequence values will be transmitted over the remaining 10 sub-carriers. In practice, it is not limited to puncturing the middlemost sequence value.

With the description of the above embodiments, it will be apparent to those skilled in the art that the method according to the above embodiments can be realized by means of software plus the necessary general hardware platform, and of course can be implemented via hardware, but in many cases the former is the better implementation. Based on this understanding, the technical solution of the present invention, in essence or in terms of parts contributing to the prior art, can be embodied in the form of a software product, which is stored in a storage medium (e.g., ROM/RAM, disc, CD-ROM) and includes a number of instructions for enabling a terminal device (which may be a mobile phone, a computer, a server, or a network device, etc.) to perform the method described in the various embodiments of the present invention.

It should be noted that each of the above-described modules can be realized by means of software or hardware, and the latter can be realized by, but not limited to, the following manner: the above-mentioned modules are located at the same processor, or the above-mentioned modules are distributed at a plurality of processors.

Embodiments of the present invention also provide a storage medium. Alternatively, in the present embodiment, the above-described storage medium may be configured to store program code for performing the method steps of the above-described embodiment.

Optionally, the storage medium is further configured to store program code for performing the method steps of the above-described embodiments.

Alternatively, in the present embodiment, the above-described storage medium may include, but not limited to, a USB disk, a Read-Only Memory (ROM), a Random Access Memory (RAM), a mobile hard disk, a magnetic Disc or CD-ROM and other media that can store program code.

Optionally, in the present embodiment, the processor executes the method steps of the above embodiments in accordance with the program code stored in the storage medium.

It will be apparent to those skilled in the art that the above-described modules or steps of the present invention may be implemented by means of a general purpose computing device, and may be placed at a single computing device or distributed over a network of multiple computing devices. Optionally, they may be implemented by means of program code executable by the computing device, so that they may be stored in a storage device and executed by a computing device, and in some cases, they may be performed in a different order from the steps shown or described here, or they may be made separately into individual integrated circuit modules, or may be implemented by making multiple modules or steps therein into a single integrated circuit module. Thus, the present invention is not limited to any particular hardware, software, and the combination thereof.

The foregoing is merely illustrative of the preferred embodiments of the present invention and is not intended to limit the present invention. Various changes and modifications may be made by those skilled in the art. Any modifications, equivalent substitutions, improvements, and the like within the spirit and principles of the invention are intended to be included within the scope of the present invention.

INDUSTRIAL APPLICABILITY

According to an embodiment of the present invention, the base station transmits the synchronization signal repeatedly and periodically to a terminal. In one repetition period, the synchronization signal is transmitted over time corresponding to a plurality of Orthogonal Frequency Division Multiplexing (OFDM) symbols in one or more subframes. The synchronization signal is a Primary Synchronization Signal (PSS) or a Secondary Synchronization Signal (SSS). Alternatively, the terminal receives the synchronization signal transmitted from a base station repeatedly and periodically. In this way, the problem associated with inappropriate design of the synchronization signals in the NB-LTE system can be solved and proper transmission of the synchronization signals in the narrow band system can be achieved.

What is claimed is:

1. A method performed by a wireless communication node, comprising:

transmitting by a transmitter of the wireless communication node a Primary Synchronization Signal (PSS) periodically to a wireless communication device, wherein the PSS in at least one subframe in a period occupies a plurality of Orthogonal Frequency Division Multiplexing (OFDM) symbols, wherein the plurality of OFDM symbols is consecutive and each corresponds to one sequence, each OFDM symbol in the plurality of consecutive OFDM symbols corresponding to a Zadoff-Chu (ZC) sequence with a length of 11, wherein the PSS is transmitted over 11 subcarriers of a downlink carrier which includes 12 subcarriers and each ZC sequence is determined by a corresponding OFDM symbol index, wherein the plurality of OFDM symbols carries no reference signal.

2. A method performed by a wireless communication node, comprising:

transmitting by a transmitter of the wireless communication node a Secondary Synchronization Signal (SSS) periodically to a wireless communication device, wherein the SSS in at least one subframe in one period occupies a plurality of Orthogonal Frequency Division Multiplexing (OFDM) symbols, wherein the plurality of OFDM symbols in at least one subframe is consecutive and each corresponds to a subset of a first sequence, each OFDM symbol in the plurality of consecutive OFDM symbols corresponding to a Zadoff-Chu (ZC) sequence with a length of 11, wherein the SSS is transmitted over 11 subcarriers of a downlink carrier which includes 12 subcarriers and each ZC sequence is determined by a corresponding OFDM symbol index, wherein the plurality of OFDM symbols carries no reference signal.

3. The method of claim 2, wherein the first sequence corresponding to the SSS in at least one subframe is configured based on at least one of the following: a cell identity and timing information.

4. A device for transmitting a synchronization signal, comprising:

a transmitter configured to transmit a Primary Synchronization Signal (PSS) periodically to a wireless communication device, wherein the PSS in at least one subframe in a period occupies a plurality of Orthogonal Frequency Division Multiplexing (OFDM) symbols, wherein the plurality of OFDM symbols is consecutive and each corresponds to one sequence, each OFDM symbol in the plurality of consecutive OFDM symbols corresponding to a Zadoff-Chu (ZC) sequence with a length of 11, wherein the PSS is transmitted over 11 subcarriers of a downlink carrier which includes 12 subcarriers and each ZC sequence is determined by a corresponding OFDM symbol index, wherein the plurality of OFDM symbols carries no reference signal.

5. A device for transmitting a synchronization signal, comprising:

a transmitter configured to transmit a Secondary Synchronization Signal (SSS) periodically to a wireless communication device, wherein the SSS in at least one subframe in one period occupies a plurality of Orthogonal Frequency Division Multiplexing (OFDM) symbols, wherein the plurality of OFDM symbols in at least one subframe is consecutive and each corresponds to subset of a first sequence, each OFDM symbol in the plurality of consecutive OFDM symbols corresponding to a Zadoff-Chu (ZC) sequence with a length of 11, wherein the SSS is transmitted over 11 subcarriers of a downlink carrier which includes 12 subcarriers and each ZC sequence is determined by a corresponding OFDM symbol index, wherein the plurality of OFDM symbols carries no reference signal.

6. The device of claim 5, wherein the first sequence corresponding to the SSS in at least one subframe is configured based on at least one of the following: a cell identity and timing information.

7. A device for receiving a synchronization signal, comprising:

a receiver configured to receive a Primary Synchronization Signal (PSS) periodically to a wireless communication device, wherein the PSS in at least one subframe in a period occupies a plurality of Orthogonal Frequency Division Multiplexing (OFDM) symbols, wherein the plurality of OFDM symbols is consecutive and each corresponds to one sequence, each OFDM symbol in the plurality of consecutive OFDM symbols corresponding to a Zadoff-Chu (ZC) sequence with a length of 11, wherein the PSS is transmitted over 11 subcarriers of a downlink carrier which includes 12 subcarriers and each ZC sequence is determined by a corresponding OFDM symbol index, wherein the plurality of OFDM symbols carries no reference signal.

8. A device for receiving a synchronization signal, comprising:

a receiver configured to receive a Secondary Synchronization Signal (SSS) periodically to a wireless communication device, wherein the SSS in at least one subframe in one period occupies a plurality of Orthogonal Frequency Division Multiplexing (OFDM) symbols, wherein the plurality of OFDM symbols in at least one subframe is consecutive and each corresponds to a subset of a first sequence, each OFDM symbol in the plurality of consecutive OFDM symbols corresponding to a Zadoff-Chu (ZC) sequence with a length of 11, wherein the SSS is transmitted over 11 subcarriers of a downlink carrier which includes 12 subcarriers and each ZC sequence is determined by a corresponding OFDM symbol index, wherein the plurality of OFDM symbols carries no reference signal.

9. The device of claim 8, wherein the first sequence corresponding to the SSS in at least one subframe is configured based on at least one of the following: a cell identity and timing information.

10. A non-transitory computer-readable medium having stored thereon computer-executable instructions for carrying out any one of claims 1, 2 and 3.

* * * * *

UNITED STATES PATENT AND TRADEMARK OFFICE
CERTIFICATE OF CORRECTION

PATENT NO. : 10,666,484 B2
APPLICATION NO. : 15/756028
DATED : May 26, 2020
INVENTOR(S) : Wen Zhang et al.

Page 1 of 1

It is certified that error appears in the above-identified patent and that said Letters Patent is hereby corrected as shown below:

In the Claims

Claim 1, Column 28, Line 38, delete "carries" and insert --carry--

Claim 2, Column 28, Line 56, delete "carries" and insert --carry--

Claim 4, Column 29, Line 9, delete "carries" and insert --carry--

Claim 5, Column 29, Line 26, delete "carries" and insert --carry--

Claim 7, Column 30, Line 10, delete "carries" and insert --carry--

Claim 8, Column 30, Line 27, delete "carries" and insert --carry--

Signed and Sealed this
First Day of September, 2020

Andrei Iancu
*Director of the United States Patent and Trademark Office*